United States Patent [19]

Agano

[11] Patent Number: 5,122,659

[45] Date of Patent: Jun. 16, 1992

[54] RADIATION IMAGE READ-OUT APPARATUS HAVING A BEAM NUMBER REDUCING DEVICE

[75] Inventor: Toshitaka Agano, Kanagawa, Japan

[73] Assignee: Fuji Photo Film Co., Ltd., Kanagawa, Japan

[21] Appl. No.: 578,487

[22] Filed: Sep. 7, 1990

[30] Foreign Application Priority Data

Sep. 7, 1989 [JP] Japan .................. 1-232594

[51] Int. Cl.$^5$ .................................................. H01J 5/16
[52] U.S. Cl. .................................. 250/236; 219/121.61
[58] Field of Search .......................... 250/236, 235; 219/121.61, 121.76, 121.68; 350/6.6, 6.8, 6.5, 6.7

[56] References Cited

U.S. PATENT DOCUMENTS

| | | | |
|---|---|---|---|
| 3,902,036 | 8/1975 | Zaleckas | 219/121.68 |
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,655,590 | 4/1987 | Aagano et al. | 219/121.76 |
| 4,854,320 | 8/1989 | Dew et al. | 219/121.61 |

FOREIGN PATENT DOCUMENTS 56-11395 2/1981 Japan.

*Primary Examiner*—David C. Nelms
*Assistant Examiner*—Que T. Le
*Attorney, Agent, or Firm*—Sughrue, Mion, Zinn Macpeak & Seas

[57] ABSTRACT

In a radiation image read-out apparatus, a stimulable phosphor sheet, on which a radiation image has been stored, is exposed to stimulating rays which cause the stimulable phosphor sheet to emit light in proportion to the amount of energy stored thereon during its exposure to radiation. The light, which is emitted by the portion of the stimulable phosphor sheet exposed to the stimulating rays, is photoelectrically detected, and an image signal representing the radiation image is thereby obtained. A plurality of laser beam sources produce laser beams, which serve as the stimulating rays. A beam combining device combines the laser beams, which have been produced by the laser beam sources, such that the beam spots of the laser beams are superposed one upon another on the stimulable phosphor sheet. A beam number reducing device prevents the laser beams, except for a single laser beam, from impinging upon the stimulable phosphor sheet.

6 Claims, 2 Drawing Sheets

RADIATION IMAGE READ-OUT APPARATUS HAVING A BEAM NUMBER REDUCING DEVICE

BACKGROUND OF THE INVENTION

1. Field of the Invention

This invention relates to a radiation image read-out apparatus for exposing a stimulable phosphor sheet, on which a radiation image has been stored, to stimulating rays, which cause the stimulable phosphor sheet to emit light in proportion to the amount of energy stored thereon during its exposure to radiation, photoelectrically detecting the emitted light, and thereby obtaining an image signal representing the radiation image. This invention particularly relates to a radiation image read-out apparatus wherein a plurality of laser beams are combined, and the combined laser beams are utilized as stimulating rays.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as a human body. In this manner, a radiation image of the object is stored on the stimulable phosphor sheet. The stimulable phosphor sheet, on which the radiation image has been stored, is then scanned with stimulating rays which cause it to emit light in proportion to the amount of energy stored thereon during its exposure to the radiation. The light emitted by the stimulable phosphor sheet, upon stimulation thereof, is photoelectrically detected and converted into an electric image signal. The electric image signal is then processed as desired. The processed image signal is used during the reproduction of a visible image which has good image quality and can serve as an effective tool in, particularly, the efficient and accurate diagnosis of an illness. The visible image finally obtained may be reproduced as a hard copy or may be displayed on a cathode ray tube (CRT).

In the radiation image read-out apparatuses for scanning a stimulable phosphor sheet, on which a radiation image has been stored, with stimulating rays, which cause the stimulable phosphor sheet to emit light in proportion to the amount of energy stored thereon during its exposure to radiation, and photoelectrically detecting the emitted light, stimulating rays having as high an intensity as possible should be used to allow the speed, with which the stimulable phosphor sheet is scanned with the stimulating rays, to be kept high. For this purpose, as disclosed in, for example, U.S. Pat. No. 4,655,590, laser beams sources and which serve as stimulating rays, may be combined such that beam spots of the laser beams are superposed one upon another on a stimulable phosphor sheet.

When a plurality of laser beams are combined, it is technically difficult for the beam spots of the laser beams to be superposed one upon another on a stimulable phosphor sheet such that their center points completely coincide with one another. In order for the cost of the radiation image read-out apparatus to be kept low, it is advantageous that slight deviation in the center points of the beam spots allowed to occur. In general, no practical problem occurs from slight deviation in the center points of the beam spots.

However, in cases where a high resolution type of stimulable phosphor sheet is used in the radiation image read-out apparatus, problems often occur from slight deviation in the center points of the beam spots. Specifically, when the center points of the beam spots deviate from one another, the effective spot diameter of the stimulating rays becomes large. Therefore, the sharpness of a radiation image read out from the high resolution type of stimulable phosphor sheet becomes low.

SUMMARY OF THE INVENTION

The primary object of the present invention is to provide a radiation image read-out apparatus, in which a plurality of laser beams are combined, and the combined laser beams are utilized as stimulating rays, and the cost of which can be kept low.

Another object of the present invention is to provide a radiation image read-out apparatus, with which the sharpness of a radiation image read out from a high resolution type of stimulable phosphor sheet can be kept high.

The present invention provides a radiation image read-out apparatus for exposing a stimulable phosphor sheet, on which a radiation image has been stored, to stimulating rays, which cause the stimulable phosphor sheet to emit light in proportion to the amount of energy stored thereon during its exposure to radiation, photoelectrically detecting the light, which is emitted by the portion of the stimulable phosphor sheet exposed to the stimulating rays, and thereby obtaining an image signal representing the radiation image, wherein the improvement comprises the provision of:
i) a plurality of laser beam sources for producing laser beams, which serve as the stimulating rays,
ii) a beam combining means for combining the plurality of said laser beams, which have been produced by said laser beam sources, such that the beam spots of said laser beams are superposed one upon another on said stimulable phosphor sheet, and
iii) a beam number reducing means which prevents the laser beams, except for a single laser beam, from impinging upon said stimulable phosphor sheet.

With the radiation image read-out apparatus in accordance with the present invention, the number of the laser beams impinging upon the stimulable phosphor sheet can be reduced such that the stimulable phosphor sheet may be scanned with only a single laser beam. Therefore, in such cases, the spot diameter of the stimulating rays can be kept smaller than when a plurality of laser beams are combined such that the center points of their beam spots slightly deviate from one another, and the stimulable phosphor sheet is scanned with the combined laser beams. Accordingly, with the radiation image read-out apparatus in accordance with the present invention, in cases where a high resolution type of stimulable phosphor sheet is used or a visible radiation image having a high sharpness is to be reproduced, the stimulable phosphor sheet can be scanned with a single laser beam having a small beam diameter. As a result, the sharpness of the radiation image read out from the stimulable phosphor sheet can be kept high.

DESCRIPTION OF THE PREFERRED EMBODIMENTS

The present invention will hereinbelow be described in further detail with reference to the accompanying drawings.

Figure 1:
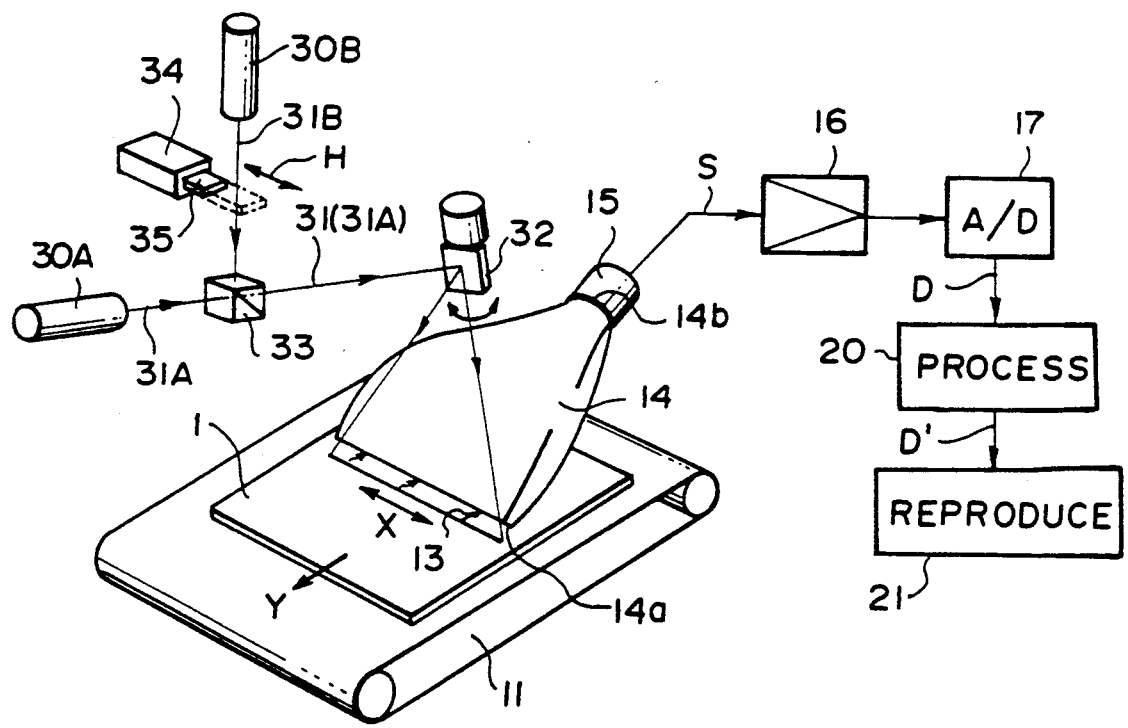
FIG. 1 is a schematic perspective view showing an embodiment of the radiation image read-out apparatus in accordance with the present invention.

FIG. 1 schematically shows an embodiment of the radiation image read-out apparatus in accordance with the present invention. In this embodiment, a laser beam source 30A and a laser beam source 30B are used as stimulating ray sources. By way of example, the laser beam sources 30A and 30B may be constituted of He-Ne lasers or semiconductor lasers. A laser beam 31A and a laser beam 31B, which serve as stimulating rays, are produced by the laser beam source 30A and the laser beam source 30B. The laser beam 31A and the laser beam 31B are combined into laser beams 31 by a polarization beam splitter 33. A shutter device 34, which serves as a beam number reducing means, is located in the vicinity of the laser beam source 30B. The shutter device 34 is provided with a shutter member 35. The shutter member 35 is moved in the direction indicated by the arrow H and is selectively located at the position that blocks the laser beam 31B (i.e. the position indicated by the broken line) and the position retracted from the optical path of the laser beam 31B (i.e. the position indicated by the solid line).

A stimulable phosphor sheet 1 carries a radiation image of an object stored thereon by, for example, being exposed to radiation which has passed through the object. The stimulable phosphor sheet 1, on which the radiation image has been stored, is conveyed in a sub-scanning direction indicated by the arrow Y by a sub-scanning means 11. The sub-scanning means 11 may be constituted of an endless belt or the like. At the same time, the combined laser beams 31 are deflected by a light deflector 32, such as a galvanometer mirror, and are caused to scan the stimulable phosphor sheet 1 in main scanning directions indicated by the double headed arrow X. (Alternatively, as will be described later, only the laser beam 31A is deflected by the light deflector 32 and caused to scan the stimulable phosphor sheet 1 in main scanning directions indicated by the double headed arrow X.) When the stimulable phosphor sheet 1 is exposed to the combined laser beams 31 (or the laser beam 31A), the exposed portion of the stimulable phosphor sheet 1 emits light 13 in an amount proportional to the amount of energy stored thereon during its exposure to radiation. The emitted light 13 enters a light guide member 14 at its light input face 14a. The light guide member 14 is formed of a transparent acrylic plate. The emitted light 13, which has entered the light guide member 14, is guided through repeated total reflection inside of the light guide member 14, emanates from a circular light output face 14b of the light guide member 14, and is received by a photomultiplier 15. The photomultiplier 15 generates an image signal S, the level of which is proportional to the amount of the emitted light 13, i.e. which represents the radiation image.

The image signal S generated by the photomultiplier 15 is logarithmically amplified by a logarithmic amplifier 16, and digitized by an A/D converter 17 into a digital image signal D. The digital image signal D is fed into an image processing circuit 20, which carries out image processing, such as gradation processing. The processed image signal is fed into an image reproducing apparatus 21 and used during the reproduction of a visible radiation image. The image reproducing apparatus 21 may be a display means, such as a CRT display device, or a recording apparatus for recording a radiation image by a light beam scanning operation on photosensitive film.

In cases where the stimulable phosphor sheet 1 has a standard level of resolution, the shutter member 35 is located at the position indicated by the solid line in FIG. 1. Therefore, in such cases, the stimulable phosphor sheet 1 is scanned with the combined laser beams 31 having a high intensity, which are obtained from the laser beam 31A and the laser beam 31B. Accordingly, by way of example, the speed, at which the stimulable phosphor sheet 1 is scanned with stimulating rays, can be kept comparatively high.

Figure 2:
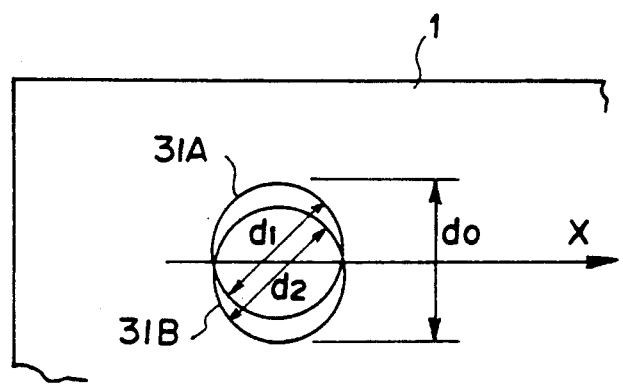
FIG. 2 is an explanatory view showing how stimulating rays are superposed one upon the other on a stimulable phosphor sheet in the embodiment of FIG. 1.

By way of example, as shown in FIG. 2, the laser beam 31A and the laser beam 31B are combined such that the center points of their beam spots on the stimulable phosphor sheet 1 slightly deviate from each other. In such cases, the effective spot diameter of stimulating rays, which scan the stimulable phosphor sheet 1, becomes equal to d0 as shown in FIG. 2. The effective spot diameter d0 is larger than the spot diameter d1 of the laser beam 31A or the spot diameter d2 of the laser beam 31B (in this example, d1−d2).

It will be possible for the laser beam 31A and the laser beam 31B to be combined such that the center points of their beam spots do not deviate from each other. However, for this purpose, a means or a process for accurately adjusting the positions of the beams is necessary, and the cost of the radiation image read-out apparatus becomes high. With this embodiment of the radiation image read-out apparatus in accordance with the present invention, such a means or such a process is not required, and therefore the cost can be kept low.

In cases where the stimulable phosphor sheet 1 is of a high resolution type, the shutter member 35 is located at the position indicated by the broken line in FIG. 1. Therefore, in such cases, the laser beam 31B does not impinge upon the polarization beam splitter 33, and the stimulable phosphor sheet 1 is scanned with only the laser beam 31A. In such cases, as shown in FIG. 2, the spot diameter of stimulating rays, which scan the stimulable phosphor sheet 1, becomes equal to d1. The spot diameter d1 is smaller than the effective spot diameter d0, which is obtained when the laser beam 31A and the laser beam 31B are combined. Accordingly, the sharpness of the radiation image read out from the high resolution type of stimulable phosphor sheet 1 can be kept high. If the high resolution type of stimulable phosphor sheet 1 is scanned with stimulating rays having a large beam spot diameter, the sharpness of the radiation image read out from the stimulable phosphor sheet 1 could easily become low.

In cases where the speed, at which the stimulable phosphor sheet 1 is scanned with stimulating rays, is kept the same, the stimulating ray energy per unit area of the stimulable phosphor sheet 1 is lower when the stimulable phosphor sheet 1 is scanned with only the laser beam 31A than when it is scanned with the combined laser beams 31. This feature with regard to the stimulating ray energy per unit are of the stimulable phosphor sheet 1 also contributes to the improvement in the image sharpness.

Figure 3:
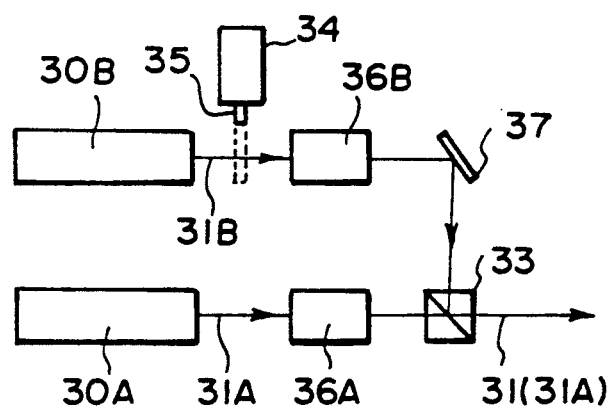
FIG. 3 is a side view showing the major part of another embodiment of the radiation image read-out apparatus in accordance with the present invention.

In the embodiment described above, the beam spot diameter d1 of the laser beam 31A and the beam spot diameter d2 of the laser beam 31B are equal to each other. Alternatively, the beam diameters of the laser beam 31A and the laser beam 31B may differ from each other such that the high resolution type of stimulable phosphor sheet 1 can be scanned with stimulating rays having a beam spot diameter smaller than in the aforesaid embodiment. FIG. 3 shows such an embodiment of the radiation image read-out apparatus in accordance with the present invention. In the embodiment of FIG. 3, the laser beam 31A produced by the laser beam source 30A is passed through a beam expander 36A, and the laser beam 31B produced by the laser beam source 30B is passed through a beam expander 36B. The beam expanders 36A and 36B adjust the beam diameters of the laser beam 31A and the laser beam 31B. The laser beam 31B, which has passed through the beam expander 36B, is reflected by a mirror 37 and then impinge upon the polarization beam splitter 33. The polarization beam splitter 33 combines the laser beam 31B with the laser beam 31A. Also, as in the embodiment of FIG. 1, the shutter device 34, which is capable of preventing the laser beam 31B from impinging upon the polarization beam splitter 33, is located between the laser beam source 30B and the beam expander 36B. The laser beams 31 thus combined are deflected and caused to scan the stimulable phosphor sheet 1 in the same manner as that described above with reference to FIG. 1. (Or, only the laser beam 31A is deflected and caused to scan the stimulable phosphor sheet 1 in the same manner as that described above with reference to FIG. 1.)

The beam expanders 36A and 36B adjust the beam diameter d1 of the laser beam 31A and the beam diameter d2 of the laser beam 31B such that d1 is smaller than d2. Therefore, when the laser beam 31B is blocked by the shutter member 35, the stimulable phosphor sheet 1 is scanned with only the laser beam 31A, which has the beam diameter markedly smaller than the effective beam diameter d0 of the combined laser beams 31. Accordingly, the sharpness of the radiation image read out from the stimulable phosphor sheet 1 can be kept markedly high.

In the embodiments described above, the shutter device 34, which blocks the laser beam 31B, is employed as the beam number reducing means. Alternatively, a means for cutting off feed of current to a laser beam source, or a means for changing the direction of the optical path of a laser beam away from the beam combining means may be employed as the beam number reducing means. By way of example, in order for the direction of the optical path of a laser beam to be changed away from the beam combining means, the mirror 37 shown in FIG. 3 may be rotated such that the laser beam 31B does not impinge upon the polarization beam splitter 33.

The radiation image read-out apparatus in accordance with the present invention is applicable also when three or more laser beams are combined together. By way of example, in a radiation image read-out apparatus wherein three laser beams are combined together, two of the three laser beams may be caused to impinge upon a beam number reducing means.

I claim:

1. A radiation image read-out apparatus for exposing a stimulable phosphor sheet, on which a radiation image has been stored, to stimulating rays, which cause the stimulable phosphor sheet to emit light in proportion to the amount of energy stored thereon during its exposure to radiation, photoelectrically detecting the light, which is emitted by the portion of the stimulable phosphor sheet exposed to the stimulating rays, and thereby obtaining an image signal representing the radiation image, wherein the improvement comprises:
i) a plurality of laser beam sources for producing laser beams, which serve as the stimulating rays,
ii) beam combining means for combining the plurality of said laser beams, which have been produced by said laser beam sources, such that beam spots of said laser beams are superposed one upon another on said stimulable phosphor sheet, and
iii) beam number reducing means for preventing the laser beams, except for a single laser beam, from impinging upon said stimulable phosphor sheet.

2. An apparatus as defined in claim 1 wherein said beam combining means is a polarization beam splitter.

3. An apparatus as defined in claim 1 wherein said beam number reducing means is a shutter device which blocks the laser beams, except for said single laser beam.

4. An apparatus as defined in claim 1 wherein said beam number reducing means is a means for cutting off feed of current to the laser beam sources which produce the laser beams, except for said single laser beam.

5. An apparatus as defined in claim 1 wherein said beam number reducing means is a means for changing the directions of the optical paths of the laser beams, except for said single laser beam, away from the beam combining means.

6. An apparatus as defined in claim 1 wherein the beam diameter of said single laser beam, which is not prevented by said beam number reducing means from impinging upon said stimulable phosphor sheet, is smaller than the beam diameters of the other laser beams.

* * * * *